(12) United States Patent
Onno

(10) Patent No.: US 9,032,207 B2
(45) Date of Patent: May 12, 2015

(54) METHOD AND SYSTEM FOR PROCESSING DIGITAL CONTENT ACCORDING TO A WORKFLOW

(75) Inventor: Stephane Onno, Cesson Sevigne (FR)

(73) Assignee: Thomson Licensing, Boulogne, Billancourt (FR)

( * ) Notice: Subject to any disclaimer, the term of this patent is extended or adjusted under 35 U.S.C. 154(b) by 131 days.

(21) Appl. No.: 13/407,303

(22) Filed: Feb. 28, 2012

(65) Prior Publication Data

US 2012/0233617 A1 Sep. 13, 2012

(30) Foreign Application Priority Data

Mar. 9, 2011 (EP) .................................... 11305248

(51) Int. Cl.
*H04L 29/06* (2006.01)
*H04N 5/262* (2006.01)

(52) U.S. Cl.
CPC ..................................... *H04N 5/262* (2013.01)

(58) Field of Classification Search
CPC .............................. H04N 5/262; H04L 9/3202
USPC .................................... 713/170, 176; 380/205
See application file for complete search history.

(56) References Cited

U.S. PATENT DOCUMENTS

| 2002/0010861 | A1* | 1/2002 | Matsuyama et al. | 713/182 |
|---|---|---|---|---|
| 2002/0184294 | A1 | 12/2002 | Volkoff et al. | |
| 2003/0135496 | A1* | 7/2003 | Ichikawa | 707/3 |
| 2007/0027915 | A1 | 2/2007 | Morris | |
| 2007/0133047 | A1 | 6/2007 | Matsueda | |
| 2010/0021001 | A1* | 1/2010 | Honsinger et al. | 382/100 |
| 2010/0070756 | A1* | 3/2010 | Onno et al. | 713/153 |
| 2010/0146298 | A1* | 6/2010 | Diehl et al. | 713/189 |

FOREIGN PATENT DOCUMENTS

| EP | 1575239 | 9/2005 |
|---|---|---|
| EP | 1696378 | 8/2006 |
| GB | 615428 | 1/1949 |
| JP | 2010129065 | 6/2010 |
| KR | 20050070520 | 7/2005 |
| TW | 221722 | 3/1994 |
| WO | WO9317449 | 9/1993 |

OTHER PUBLICATIONS

European Search Report dated Jul. 1 , 2011.

* cited by examiner

*Primary Examiner* — Justin T Darrow
(74) *Attorney, Agent, or Firm* — Jeffrey D. Carter

(57) ABSTRACT

A method of processing content according to a workflow, where a digital content is processed on one of a plurality of processing devices according to process definition associated to the content, includes the steps, iterated at the processing device, of:
 a) receiving from a server a signed workflow information, a workflow information comprising a status of the content processing, a signature of the process definition and a hash of the content;
 b) verifying the workflow information;
 c) when the workflow information is verified, processing the content according to the process definition and according to status of the content processing;
 d) updating and signing the workflow information;
 e) sending to the server the signed workflow information;
and the steps iterated at the server of:
 f) receiving from a processing device a signed workflow information;
 g) publishing the signed workflow information received from the processing device. A system for performing the method is also provided.

17 Claims, 5 Drawing Sheets

METHOD AND SYSTEM FOR PROCESSING DIGITAL CONTENT ACCORDING TO A WORKFLOW

This application claims the benefit, under 35 U.S.C. §119 EP Patent Application 11305248.4, filed 9 Mar. 2011.

FIELD OF THE INVENTION

The invention relates to generally to digital content processing, and in particular to workflows for digital content.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Content, such as multimedia content—e.g. films and music—documents, photos and so on often need to be processed before it is released for the enjoyment of the end user.

Films, for example, pass many processing steps from the actual recording to the release: de-rushing, mixing, addition of digital effects, dubbing, subtitling, and so on.

It will be readily appreciated that a content provider has two requirements for a processing (also called post-processing) system: 1) strict and traceable processing operations, and 2) easy transmission and duplication of the content. The person skilled in the art will appreciate that prior art systems satisfy one or the other requirement, but not both.

Analogue systems generally satisfy the first requirement. As content is stored on tapes or film reels, it is relatively easy to control the processing: a particular content remains with a certain department until the tape is sent to the next department. In addition, it is also possible to trace the tape in case of theft. On the other hand, transmission of the content is less straight-forward, as this requires sending the physical tape, which naturally is difficult, particularly if long distances are involved. It is also difficult to provide the content to more than one entity at once, as the content has to be physically duplicated. In addition, erasing and/or destroying content after use may also provide constraints on the users.

Digital systems provide easy transmission and duplication of content. However, it is much more difficult to control the processing of the content: if the content resides on a server, it is very difficult to control who has access to it and errors may often be made if one department erroneously believes that the previous department has finished processing the content.

FIG. 1 shows an exemplary processing system in which the invention may be used. The system 100 comprises a subtitling device 110, a colour management device 120, a dubbing device 140, a digital special effects device 150, a storage device 160, and an emission clearance device 130, all connected by a network 170.

In the system of FIG. 1, it may for example be required that content pass colour management 120 and digital effects 150 (in no particular order) before being sent to dubbing 140 and optionally further to subtitling 110, before passing through emission clearance 130. As every device has access to the storage 160, it is difficult to control that the workflow is respected.

A solution addressing the security of a workflow management system relies on a Digital Process Management (DPM) system allowing or not the processing of a given content at a given activity of a given content workflow. Prior art uses one of two approaches:

either a pure centralized system which does not allow off-line processing;

or a pure distributed system which causes the issue of impersonating an application, overriding of a work, updating a process definition . . .

It can thus be appreciated that there is a need for an alternative solution that enables a digital processing system allowing the flexibility of distributed processing scheme while keeping minimal the control in a centralized approach.

The present invention provides such a solution, with a number of variants.

SUMMARY OF THE INVENTION

The purpose of the invention is to overcome at least one of the disadvantages of prior art by proposing a method for controlling a workflow allowing the flexibility of distributed processing scheme while keeping minimal the control in a centralized approach. The idea of the invention is to publish and certifies workflow information comprising information relative to the status of the content in the workflow, to the integrity of each workflow step and workflow participant, to the integrity of the processed content . . . Either a central device accountable for publishing workflow information or a processing device updating workflow information after performing a step in the workflow can verify workflow information. Thus the invention guarantees the integrity and the non-repudiation of processed content. Each workflow participant (or processing device or application) is accountable from an identified work. The invention advantageously guarantees that the content to process by the application is the current version one. The invention advantageously guarantees that each workflow participant i.e. processing application is trusted. The invention also advantageously allows process definition overriding securely and seamlessly.

To this end, the invention is directed to a method of processing contents according to a workflow, where a digital content is processed on one of a plurality of processing devices according to process definition associated to the content. The steps of the method are iterated at a processing device or at the server.

In a first aspect, the method of processing contents according to a workflow is iterated at the processing device and comprises the steps of:

a) receiving from a server a signed workflow information, the workflow information comprising a status of the content processing, the signature of the process definition and a hash of the content;

b) verifying the workflow information;

c) when the workflow information is verified, processing the content according to the process definition and according to status of the content processing;

d) updating and signing the workflow information;

e) sending to the server the signed workflow information.

Thus, the processing device is advantageously guaranteed that the content to process and the process to enforce are the current version one since the information is centralized by a server.

According to a first embodiment, the step b) of verifying the workflow information comprises verifying the signature of the workflow information issued from a device among the server, the plurality of processing devices. Thus, the processing device is advantageously guaranteed that the preceding processing device is trusted. Indeed, the workflow information is either signed by a preceding processing device or, after a verification of the preceding processing, by the server. The signature of the server advantageously improves the guarantee relative to workflow information.

According to a second embodiment, the step b) of verifying the workflow information comprises verifying the signature of the process definition issued from a device among the server, the plurality of processing devices. Thus, the processing device is advantageously guaranteed that the process definition is not override.

According to a third embodiment, the step b) of verifying the workflow information comprises verifying the hash of the content issued from a device among the server, the plurality of processing devices. Thus, the processing device is advantageously guaranteed of the content integrity.

According to a fourth embodiment, the step b) of verifying the workflow information further comprises verifying the status of the content processing issued from a device among the server, the plurality of processing devices. According to variant, the status of the content comprises information relative to the progress in the process graph, to source and destination device, to the last owner, to the history of the process tasks. The information relative to history advantageously guarantees the non-repudiation of processed content According to a particularly advantageous characteristic of the invention, the method further comprises a step of receiving a content and a process definition associated to the content from a device among the server, the plurality of processing devices. According to another advantageous characteristic the method further comprises a step of sending the processed content to a device among the server, the plurality of processing devices. Such characteristic of the invention proposes a solution compatible with either a centralized or distributed approach of the content processing.

In a second aspect, the method of processing contents according to a workflow is iterated at the server and comprises the steps of:

d) receiving from a processing device a signed workflow information, the workflow information comprising a status of the content processing, a signature of the process definition and a hash of the content ;

e) publishing the signed workflow information.

Thus, the signed workflow information received from the processing device is only published by the server, without further verification, for the plurality of processing devices.

According to a particularly advantageous characteristic of the invention, the publishing step comprises verifying the workflow information; when the workflow information is verified, updating and signing the workflow information. Thus, the workflow information verified and signed by the server is published for the plurality of processing devices. Such characteristic of the invention advantageously improves the security of the workflow.

According to another advantageous characteristic, the method further comprises the preceding steps, at the server, of:

a) creating a workflow information that associates a process definition to a content, the workflow information comprising the initial status of the content processing, a signature of the process definition and a hash of the content;

b) signing the workflow information;

c) publishing the signed workflow information.

Thus the method also advantageously allows process definition creating and overriding securely and seamlessly.

According to a first embodiment, the step e1) of verifying the workflow information comprises verifying the signature of the workflow information issued by the processing device.

According to a second embodiment, the step e1) of verifying the workflow information further comprises verifying the signature of the process definition issued by the processing device.

According to a third embodiment, the step e1) of verifying the workflow information further comprises verifying the hash of the content issued by the processing device.

According to a fourth embodiment, the step e1) of verifying the workflow information further comprises verifying the status of the content issued by the processing device.

In a third aspect, the invention is directed to a system for processing contents according to a workflow comprising at least one processing device and a server, where a content is processed on one of a plurality of processing devices according to process definition associated to the content.

The system comprises a server comprising means for creating a workflow information that associates a process definition to a content, the workflow information comprising the initial status of the content processing, a signature of the process definition and a hash of the content; means for signing the workflow information; means for publishing the signed workflow information; means for receiving from a processing device a signed workflow information; and means for verifying the workflow information.

The system further comprises a processing device comprising means for receiving from the server a signed workflow information; verifying the workflow information; processing the content according to the process definition and according to status of the content processing; updating and signing the workflow information; sending to the server the signed workflow information.

BRIEF DESCRIPTION OF THE DRAWINGS

Other characteristics and advantages of the invention will appear through the description of a non-limiting embodiment of the invention, which will be illustrated, with the help of the enclosed drawings.

In the figures, the represented blocks are purely functional entities, which do not necessarily correspond to physically separate entities. These functional entities may be implemented as hardware, software, or a combination of software and hardware; furthermore, they may be implemented in one or more integrated circuits.

DETAILED DESCRIPTION OF PREFERRED EMBODIMENTS

Figure 1:
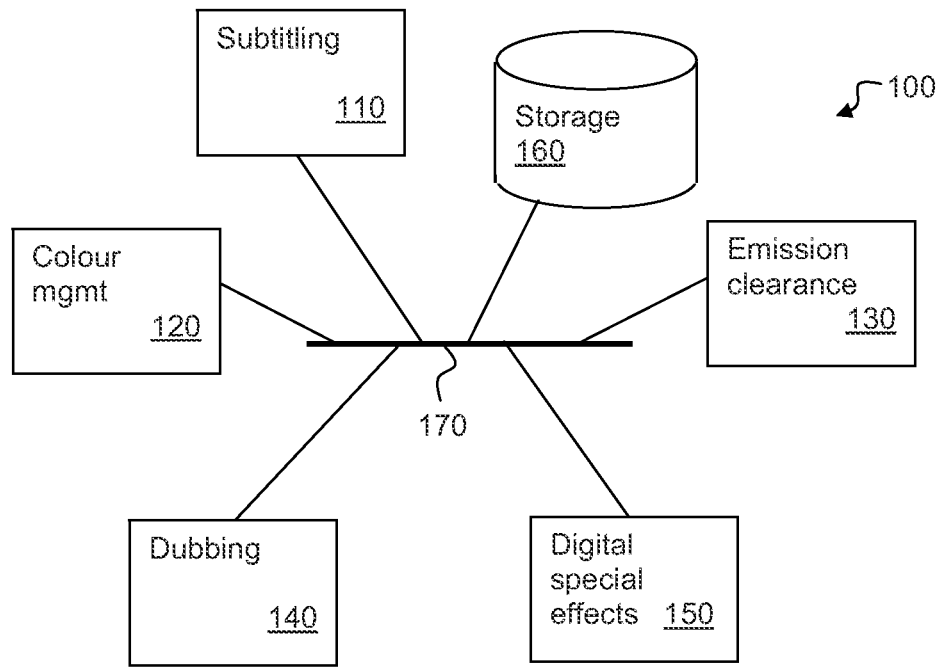
FIG. 1, already discussed, illustrated an exemplary processing system in which the invention may be used.
Figure 2:
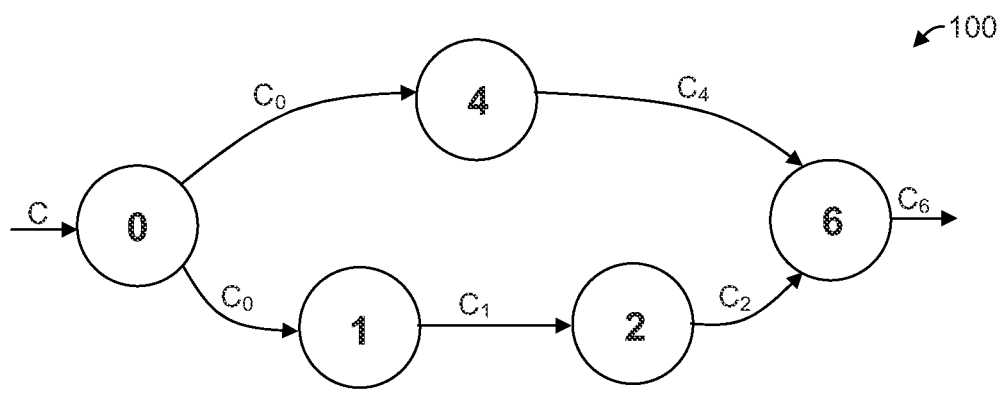
FIGS. 2 illustrates a process graph for use with the present invention.

FIG. 2 illustrates a process graph for use with the present invention. The process graph 200 has an entry node 0 and an exit node 6, and two possible paths between these nodes. A first path passes through node 4, while the second path passes through nodes 1 and 2.

According to the process graph 200, content C is first treated at node 0 to produce processed content $C_0$. The processed content $C_0$ then passes through one of the two paths, usually at the choice of a user. If the first path is chosen, the processed content $C_0$ is treated at node 4 to generate processed content $C_4$. On the other hand, if the second path is chosen, then the processed content $C_0$ is first treated at node 1 to generate processed content $C_1$ and then at node 2 to generate processed content $C_2$. Finally, node 10 processes processed content $C_4$ or processed content $C_2$ to generate processed content $C_{10}$.

For example, node 0 can be a special effects module, node 1 a subtitling module, node 2 a dubbing module, node 4 an editing module adapted to generate a preview, and node 10 a release clearance module. As such it will be appreciated that a node not necessarily modifies the content. It will also be appreciated that content may pass through both paths of the process graph 200, which would generate two different processed contents $C_{10}$ and $C'_{10}$.

Figure 3:
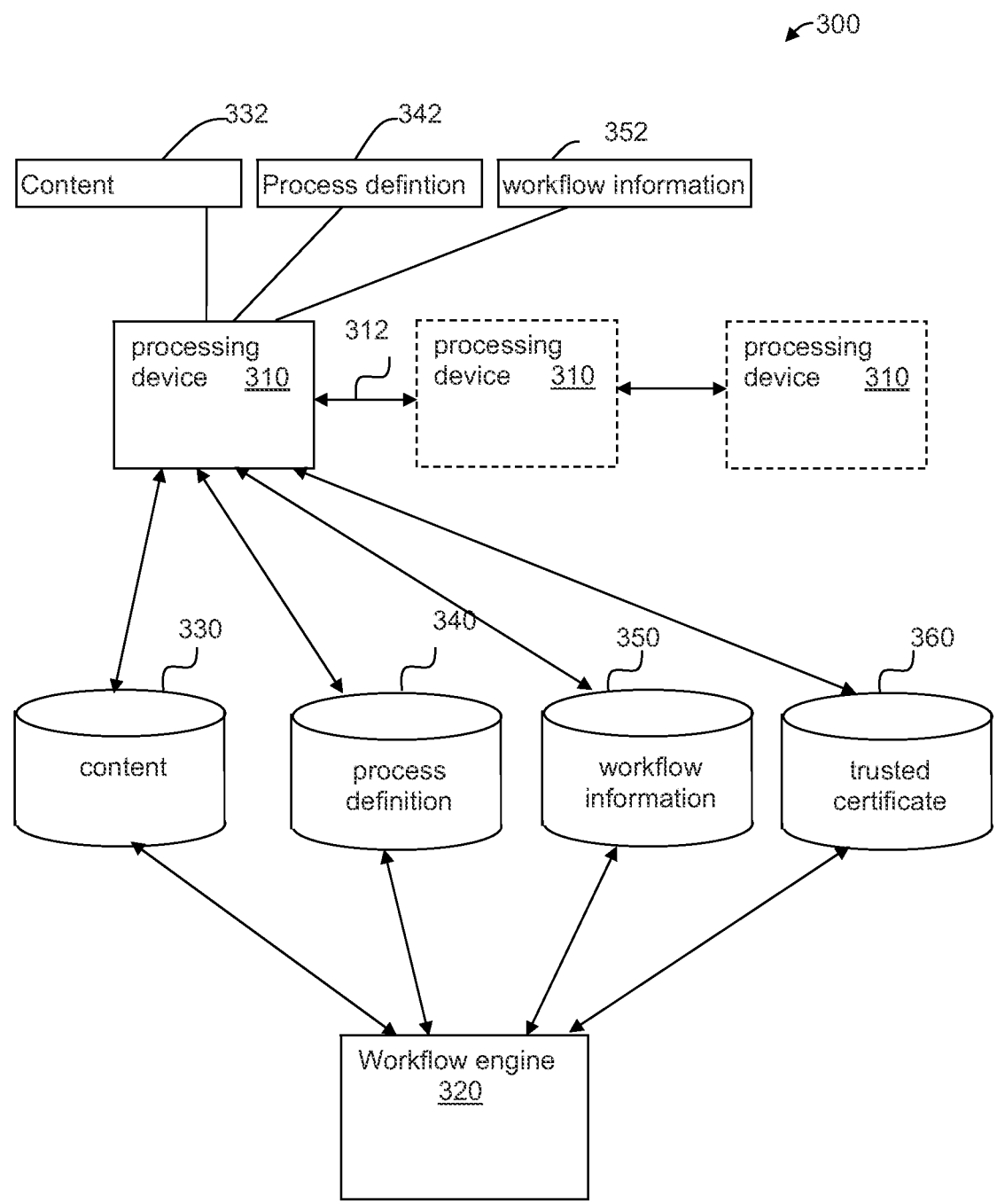
FIG. 3 illustrates a system for digital content processing according to a preferred embodiment of the invention.

FIG. 3 illustrates a system for digital content processing according to a preferred embodiment of the invention. The system 300 comprises at least one processing device 310 and a workflow engine 320. By processing device or workflow participant or workflow application, it should be understood a means to process the content which therefore refers to a physical implementation of a node as represented on FIG. 2. By central device or workflow engine or server, it should be understood a means to centralize, publish and certify information relative to the workflow. The workflow engine also associates a path of the process graph to a content therefore resulting in a different processed content as represented on FIG. 2. Such path in the process graph is named process definition. A process definition for instance comprises the special effect, subtitling and dubbing sequence of tasks. A task, or a treatment or a processing step in the process definition is also called an activity. The system 300 comprises repositories for storing information relative to the workflow. A content database 330 stores digital content such as films, either original content to be processed or currently processed content. A process definition database 340 stores possible paths in the process graph, in other words data handled by the server which depicts what should be done at each step of the process. A workflow information database 350 stores run-time data updated by processing devices and published, certified by the server. A trusted certificates database 360 stores public certificates of the processing devices 310 or of the central device 320. Each processing device 310 is granted a public certificate for verifying and signing the workflow information and keeps confidential its corresponding secret key. Similarly, in a variant, the workflow engine 320 is given a public certificate for signing the process definition and keeps confidential the related secret key.

Advantageously, the invention is compatible with either a centralized or a distributed workflow. In a centralized approach, for each processing step, a processing device 310 retrieves content 332 from the content database 330, the process definition relative to the current content 342 from the process definition database 340 and workflow information 352 from the workflow information database 350. Then, after verifying the workflow information, the processing device 310 enforces the process definition on the content. Finally, the processing device 310 stores updated data for content and for the workflow information in each respective database. Then, according to the invention, the workflow engine 320 is able to verify and publish the workflow information for following processing step. The retrieving, processing and storing operations are sequentially reiterated for each processing step. In a variant of the centralized approach, the central device 320 distributes the data to the processing devices 310.

In a distributed approach, a processing device 310 sends the content and the process definition to a next processing device 310. However the workflow information 352 is released to the workflow engine 320 for verification and publication.

Figure 4:
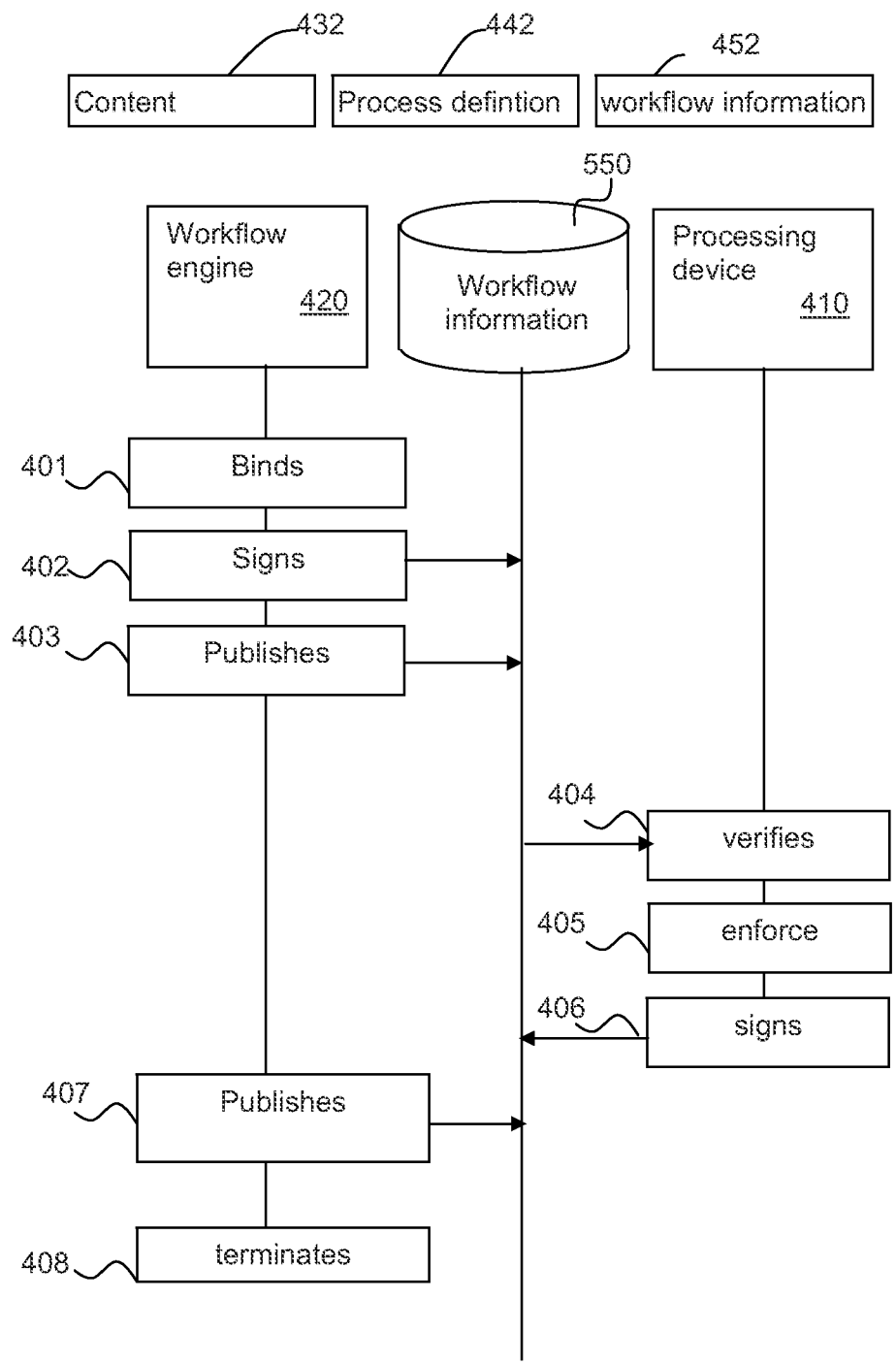
FIG. 4 illustrates a method for digital content processing according to a preferred embodiment of the invention.

The steps of generation, update, verification and publication of the workflow information are described according to a preferred embodiment. FIG. 4 illustrates a method for digital content processing according to the preferred embodiment of the invention. For the preferred embodiment, the process definition 442 is separated from the workflow information 452. The process definition 442 is handled by the workflow engine 420 and depicts what should be done at each step of the process. On the other side, the workflow information 452 comprising all the run-time information is handled by processing devices 410.

In a first step 401, a workflow engine 420 creates a workflow information 452 that binds a process definition 442 to a given content 432 to process. In a second step 402, the workflow engine 420 signs the workflow information. Then, in a step 403, the workflow engine 420 publishes the workflow information as "current".

In a next step 404, a relevant processing device 410 retrieves current workflow information and verifies the current workflow information for instance relating to issuer, to content integrity or process definition progress. Various embodiments of data carried by workflow information are latter described referring to FIGS. 5a and 5b. Then, in a following step 405, the processing device 410 enforces the process definition 442 on the current content 432. After the processing step 405, the processing device 410 updates, signs 406 the workflow information and notifies it to the workflow engine in a step 406. In step 407, the workflow engine 420 publishes the signed workflow information as "current".

The steps 404 to 407 are iterated for each step of the process definition. Upon completion of the process definition, in a last step 408 the workflow engine 420 terminates the process, for instance by removing the workflow information.

In a variant, the workflow engine 420 also signs the process definition 442 during the binding step 401. In another variant, the workflow engine 420 also checks the workflow information after all or a selection of the processing steps 405. This variant advantageously improves the security of such DPM. In another variant, the workflow engine 420 also updates and signs it again before or after each processing step 405. Thus the publishing workflow information is certified by the server. Similarly, in another variant, the workflow engine 420 also manages and publishes the list of trusted processing devices.

In another embodiment, each processing device 410 adds and signs a data history in the workflow information such as a hash value of preceding workflow information.

Advantageously, the whole or a part of the steps of a processing method according to the invention, are automated and each devices automatically notified of the progress in the processing method.

Figure 5A:
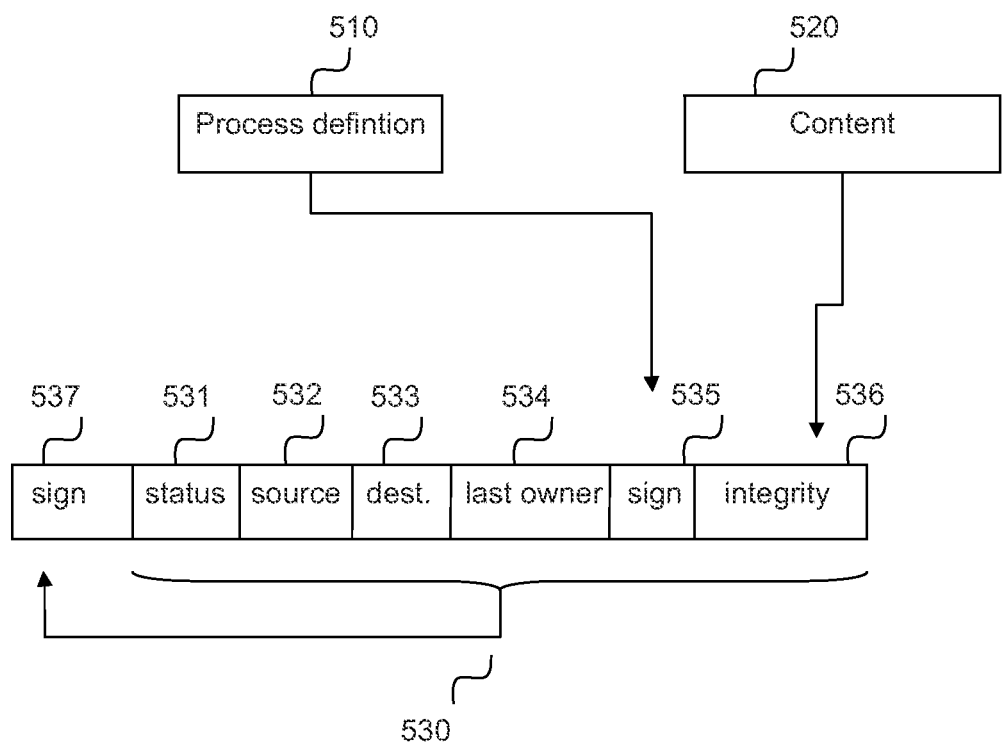
FIG. 5a and FIG. 5b illustrate workflow information according to a preferred embodiment of the invention.
Figure 5B:
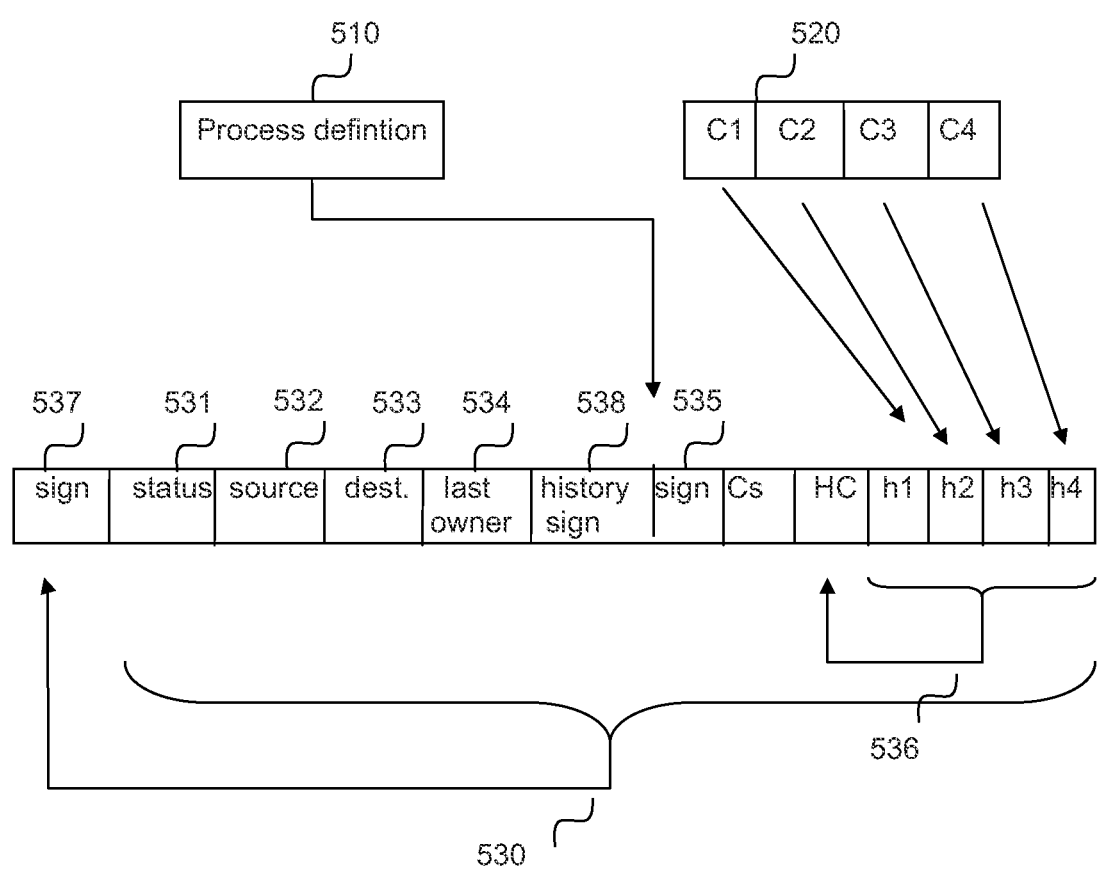

FIG. 5a and FIG. 5b illustrate workflow information according to a preferred embodiment of the invention. The workflow information data relates to issuer, content integrity and process definition progress. In a preferred embodiment, the workflow information 530 comprises a status field 531 describing the progress of the content in the process graph, a source field 532 giving information about the processing device having completed a processing task, a destination field 533 giving information about the processing device destined to process the task, a last owner field 534. Besides the workflow information 530 comprises a process definition signature field 535 and content integrity field 536. In a variant, the workflow information data also carries a signature field 537 carrying the signature of all the aforementioned data. Advantageously, the processing device could verify inner workflow information such as verify if the process definition is the current one, if the process definition signature is the one of the server, if the content of the processing device is the same as the one referred in the workflow information, or if the signature of the source issuer is the same as the one of the workflow information.

Thus, in the binding step 401, the workflow engine initiates the workflow information subfields 531, 532, 533, 534. It computes integrity value for the content 520 for instance by computing a hash value of the content. In a variant represented on FIG. 5b, when the content is large, the content 520 is split into several content chunks C1, C2, C3, C4 and a hash value h1, h2, h3, h4 is computed for each content chunk. A hash HC of hash values h1, h2, h3, h4 is computed for the whole content. Advantageously, if an activity only applies to part of content chunks, the hash values for theses chunks only have to be computed. The other one remains unmodified. In another variant also represented on FIG. 5b, a field 538 of the workflow information carries a history signature. Each processing device adds a signature after having processing the content. Thus, the sequence of the processing devices in the process definition is easily traced for the content.

Finally, the workflow engine signs the related process definition 510 and embeds content integrity value and process definition signature in the corresponding fields 536, 535. In the signing step 402, the workflow engine signs the workflow information 530 with its private key and embeds the workflow information signature in the sign filed 537.

In the verification step 404, a processing device verifies the correctness of workflow information and related information such as integrity of the content, signature of the process definition and signature of the last workflow information issuer which is either the workflow engine or a processing device. Each processing device accesses the list of available certificates to check issuer signature. Once the processing device has enforced the workflow information regarding the process definition by checking the status of the workflow, checking activity conditions, it updates workflow information data for further steps similarly to the binding step performed by the workflow engine and notifies it to the workflow engine. In a variant represented on FIG. 5b, the processing device also adds a history signature 538 for the current processed step in the workflow information.

In the publishing step 407, the workflow engine publishes the current workflow information for all the processing devices. Optionally, the workflow engine publishes the current content data (for instance in a centralized processing approach). Optionally, the workflow engine checks the correctness of workflow information from the processing device. Advantageously, the workflow engine is able to override a process definition, publish a new current process definition and sign it again with its private key. The new current process definition is verified through the workflow engine signature and thus enforces by the processing devices. Advantageously, the workflow engine is further able to revoke any processing device by publishing the list of trusted certificates or a list of revoked certificates.

It will thus be appreciated that the present invention provides a solution guarantying the integrity and the non-repudiation of processed content. The invention also advantageously allows process definition overriding securely and seamlessly.

Each feature or variant disclosed in the description, in the claims or in the drawings may be provided independently or in any appropriate combination.

What is claimed, is:

1. A method of processing digital contents according to a workflow, where a digital content is processed on one of a plurality of processing devices according to a process definition associated to the digital content, the method comprising steps, iterated at the processing device, of:
   receiving from a server a signed workflow information, the signed workflow information comprising a status of content processing, a signature of the process definition and a hash of the digital content;
   verifying the signed workflow information;
   after the signed workflow information is verified, processing the digital content according to the process definition and according to the status of the content processing;
   updating and signing the signed workflow information to generate updated workflow information; and
   sending to the server the updated workflow information.

2. The method according to claim 1, wherein the step of verifying the signed workflow information comprises verifying a signature of the signed workflow information issued from a device among the server and the plurality of processing devices.

3. The method according to claim 1, wherein the step of verifying the signed workflow information comprises verifying the signature of the process definition issued from a device among the server and the plurality of processing devices.

4. The method according to claim 1, wherein the step of verifying the signed workflow information further comprises verifying the hash of the digital content issued from a device among the server and the plurality of processing devices.

5. The method according to claim 1, wherein the step of verifying the signed workflow information further comprises verifying the status of the content processing issued from a device among the server and the plurality of processing devices.

6. The method according to claim 1, further comprising a step of receiving a content and a process definition associated to the content from a device among the server and the plurality of processing devices.

7. The method according to claim 1, further comprising a step of sending the processed content to a device among the server and the plurality of processing devices.

8. A method of processing contents according to a workflow, where a digital content is processed on one of a plurality of processing devices according to a process definition associated to the digital content, the method comprising steps, iterated at a server, of:
   receiving from a processing device a signed workflow information, the signed workflow information comprising a status of content processing, a signature of the process definition and a hash of the digital content; and
   publishing the signed workflow information.

9. The method according to claim 8, further comprising steps, at the server, of:
   creating the signed workflow information that associates the process definition to the digital content, the signed workflow information comprising an initial status of the content processing, the signature of the process definition and the hash of the digital content;
   signing the signed workflow information and generating updated workflow information; and
   publishing the updated workflow information.

10. The method according to claim 8, wherein the step of publishing further comprises, at the server, the substeps of:
- verifying the signed workflow information; and
- after the signed workflow information is verified, updating and signing the signed workflow information to generated updated workflow information.

11. The method according to claim 10, wherein the step of verifying the signed workflow information comprises verifying the signature of the signed workflow information issued by the processing device.

12. The method according to claim 10, wherein the step of verifying the signed workflow information further comprises verifying the signature of the process definition issued by the processing device.

13. The method according to claim 10, wherein the step of verifying the signed workflow information further comprises verifying the hash of the digital content issued by the processing device.

14. The method according to claims 10, wherein the step of verifying the signed workflow information further comprises verifying the status of the digital content issued by the processing device.

15. A system for processing digital contents according to a workflow comprising at least one processing device and a server, where a digital content is processed on one of a plurality of processing devices according to a process definition associated to the digital content, the system comprising:
- a server comprising a processor configured for:
- creating a workflow information that associates a process definition to a digital content, the workflow information comprising an initial status of content processing, a signature of the process definition and a hash of the digital content;
- signing the workflow information;
- publishing the signed workflow information;
- receiving from a processing device a signed workflow information; and
- verifying the received workflow information; and
- a processing device comprising a processor configured for:
- receiving from the server a signed workflow information;
- verifying the received signed workflow information;
- processing the digital content according to the process definition and according to a status of the content processing;
- updating and signing the received signed workflow information to generate an updated workflow information; and
- sending to the server the updated workflow information.

16. A server, comprising:
- a processor configured for creating a workflow information that associates a process definition to a digital content, the workflow information comprising an initial status of content processing, a signature of the process definition and a hash of the digital content; signing the workflow information; publishing the signed workflow information; receiving a signed workflow information from a processing device; and verifying the received workflow information.

17. A device, comprising:
- a processor configured for receiving a signed workflow information from a server, verifying the received signed workflow information, processing digital content according to a process definition associated to the digital content and according to a status of content processing, updating and signing the received signed workflow information to generate an updated workflow information, and sending to the server the updated workflow information.

* * * * *